(12) United States Patent
Otoshi

(10) Patent No.: US 6,179,189 B1
(45) Date of Patent: Jan. 30, 2001

(54) CONTROL DEVICE OF CONTINUOUS MATERIAL FEED DEVICE

(75) Inventor: Yoshihiro Otoshi, Aichi-ken (JP)

(73) Assignee: Yamada Dobby, Co., Ltd., Bisai (JP)

( * ) Notice: Under 35 U.S.C. 154(b), the term of this patent shall be extended for 0 days.

(21) Appl. No.: 09/173,563

(22) Filed: Oct. 16, 1998

(30) Foreign Application Priority Data

May 29, 1998 (JP) .................................................. 10-149916

(51) Int. Cl.$^7$ .................................................. B65H 23/18
(52) U.S. Cl. .......................... 226/32; 262/161; 700/124
(58) Field of Search ........................ 226/32, 150, 161, 226/8; 700/114, 124, 122, 125, 206

(56) References Cited

U.S. PATENT DOCUMENTS

| | | | |
|---|---|---|---|
| 2,821,388 | * 1/1958 | Crane et al. ............................ | 226/32 |
| 3,115,999 | * 12/1963 | Wythe ..................................... | 226/32 |
| 3,873,014 | * 3/1975 | Matsuhisa .......................... | 226/150 X |
| 3,873,899 | 3/1975 | Seo et al. . | |
| 4,078,416 | 3/1978 | Voorhees et al. . | |
| 5,117,365 | * 5/1992 | Jeschke et al. ....................... | 700/124 |
| 5,310,105 | 5/1994 | Mills . | |
| 5,361,696 | * 11/1994 | Kato et al. ........................... | 700/124 |
| 5,478,001 | * 12/1995 | Pillsbury et al. ........................ | 226/8 |
| 5,833,105 | * 11/1998 | Stuber ................................... | 226/8 X |
| 5,901,647 | * 5/1999 | Kohlmann ......................... | 700/125 X |

FOREIGN PATENT DOCUMENTS 0 496 270 A1   7/1992 (EP) .

* cited by examiner

Primary Examiner—Donald P. Walsh
Assistant Examiner—Minh-Chau Pham
(74) Attorney, Agent, or Firm—Arent Fox Kintner; Plotkin & Kahn PLLC

(57) ABSTRACT

A continuous material feed device is provided with a motor driving a continuous material feed mechanism, and transfers a continuous material into a press intermittently. Its control device is provided with (1) a position detector for detecting position of the continuous material feed mechanism, and (2) a control circuit for (a) fixing and storing previously the optimum pattern command value of behavior of the continuous material feed mechanism, (b) calculating error between the real position data from the position detector and the fixed command value of the optimum pattern in a prescribed period of time from the drive start of the continuous material feed mechanism, (c) correcting the command value to be output in order to eliminate the error (d) outputting the command value after the correction (e) controlling the motor.

10 Claims, 12 Drawing Sheets

CONTROL DEVICE OF CONTINUOUS MATERIAL FEED DEVICE

BACKGROUND OF THE INVENTION (1) Field of the Invention

The present invention relates to a control device of a continuous material feed device to be installed in a press, more specifically to a continuous material feed device such as a gripper feed, a roll feed or a roll gripper.

(2) Description of the Prior Art

In general, a continuous material feed device (in this specification, excluding a transfer device) to be installed in a press is so constituted that a continuous material (in this specification, comprising a series of wire rod, coil material or band material including that as a secondary machining material) is sent to a press intermittently.

In this connection, a novel continuous material feed device is being developed, which is such device that a linear motor is assembled in a continuous material feed device as above described.

Also such device is known that a servo motor is assembled in a continuous material feed device.

SUMMARY OF THE INVENTION

An object of the present invention is to improve the feeding accuracy in such a continuous material feed device in which a linear motor or a servo motor is assembled.

DESCRIPTION OF THE PREFERRED EMBODIMENTS

Figure 1:
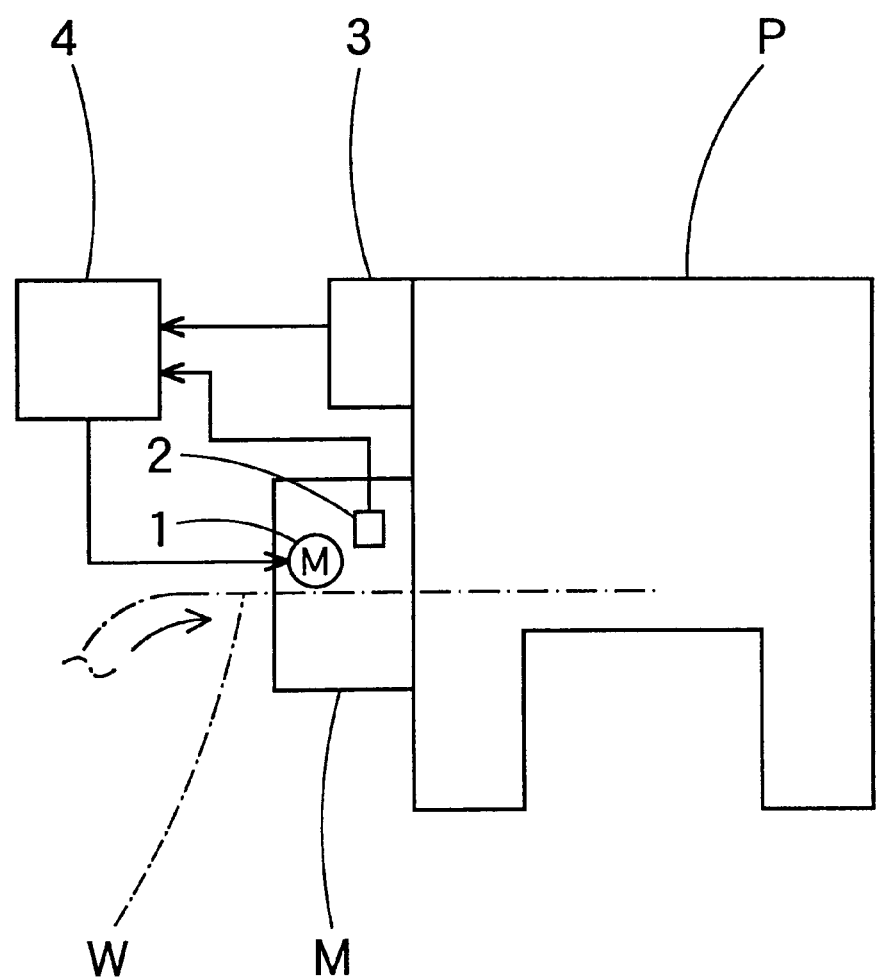
FIG. 1 is a diagram showing a system to which a control device according to an embodiment of the invention is applied.

FIG. 1 is a diagram showing a system to which a control device according to an embodiment of the present invention is applied.

In FIG. 1, a continuous material feed device M is installed at the inlet side of a continuous material W of a press P. The continuous material feed device M is partially provided with a motor 1 as a drive source of a continuous material feed mechanism. Also a position detector 2 is provided for detecting position of the continuous material feed mechanism. On the other hand, the press P is provided with a crank angle detector 3 for detecting crank angle. The motor 1, the position detector 2 and the crank angle detector 3 are connected electrically to a control device 4. The control device 4 controls the motor 1 based on the real position signal from the position detector 2 while taking timing by the crank angle based on the signal from the crank angle detector 3.

Figure 2:
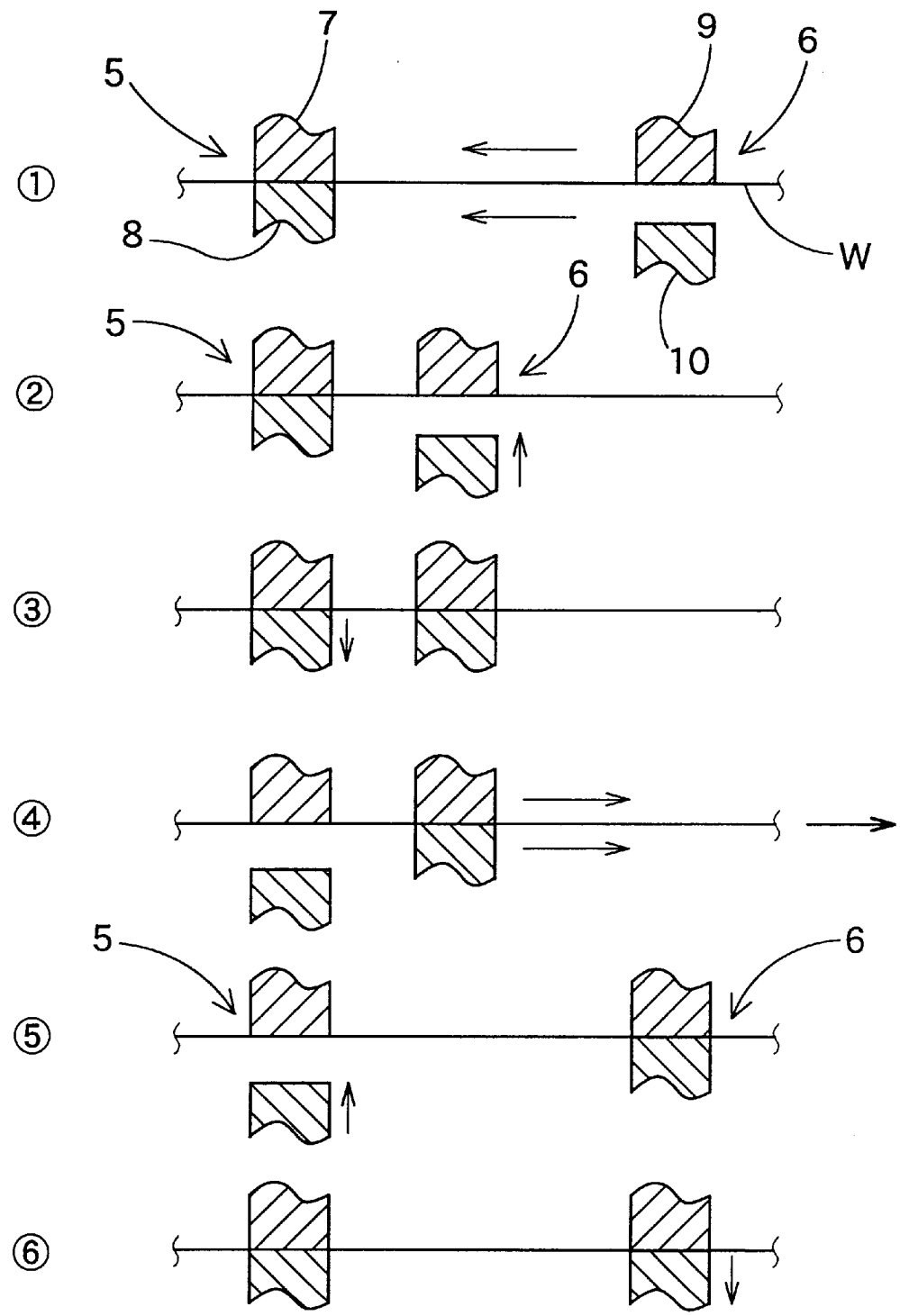
FIG. 2 is an operation explanation diagram of a gripper feed as an example of a continuous material feed device.

FIG. 2 is an operation explanation diagram of a gripper feed as an example of the continuous material feed device M.

Figure 3:
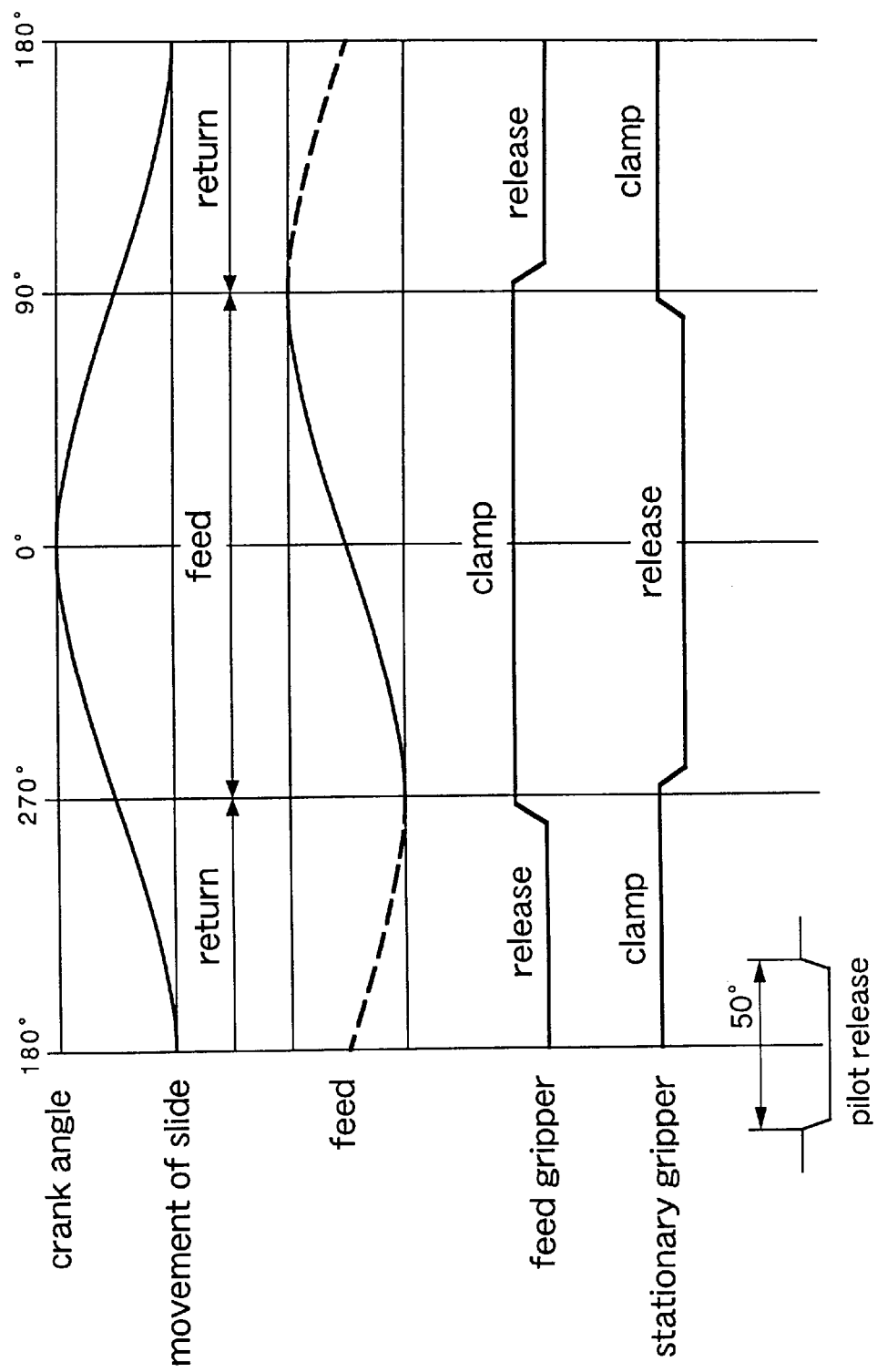
FIG. 3 is a timing diagram.

In FIG. 2, the gripper feed comprises a stationary gripper 5 and a feed gripper 6. The stationary gripper 5 comprises a stationary jaw 7 positioned at the upper side, and a movable jaw 8 positioned at the lower side and movable up and down. On the other hand, the feed gripper 6 comprises a movable jaw 9 positioned at the upper side and movable in reciprocation in the feed direction, and a movable jaw 10 positioned at the lower side and movable in reciprocation in the feed direction and also movable up and down solely. The stationary gripper 5 and the feed gripper 6 perform a series of operations as shown in ①–⑥ FIG. 2. That is, the return operation of the feed gripper 6 in the release state of the feed gripper 6 and in the clamp state of the stationary gripper 5 and the feed operation of the feed gripper 6 in the clamp state of the feed gripper 6 and in the release state of the stationary gripper 5 are performed repeatedly, and the continuous material W is fed intermittently to the press P. Such a series of operations of the stationary gripper 5 and the feed gripper 6 can be expressed as a timing diagram in FIG. 3.

Figure 4:
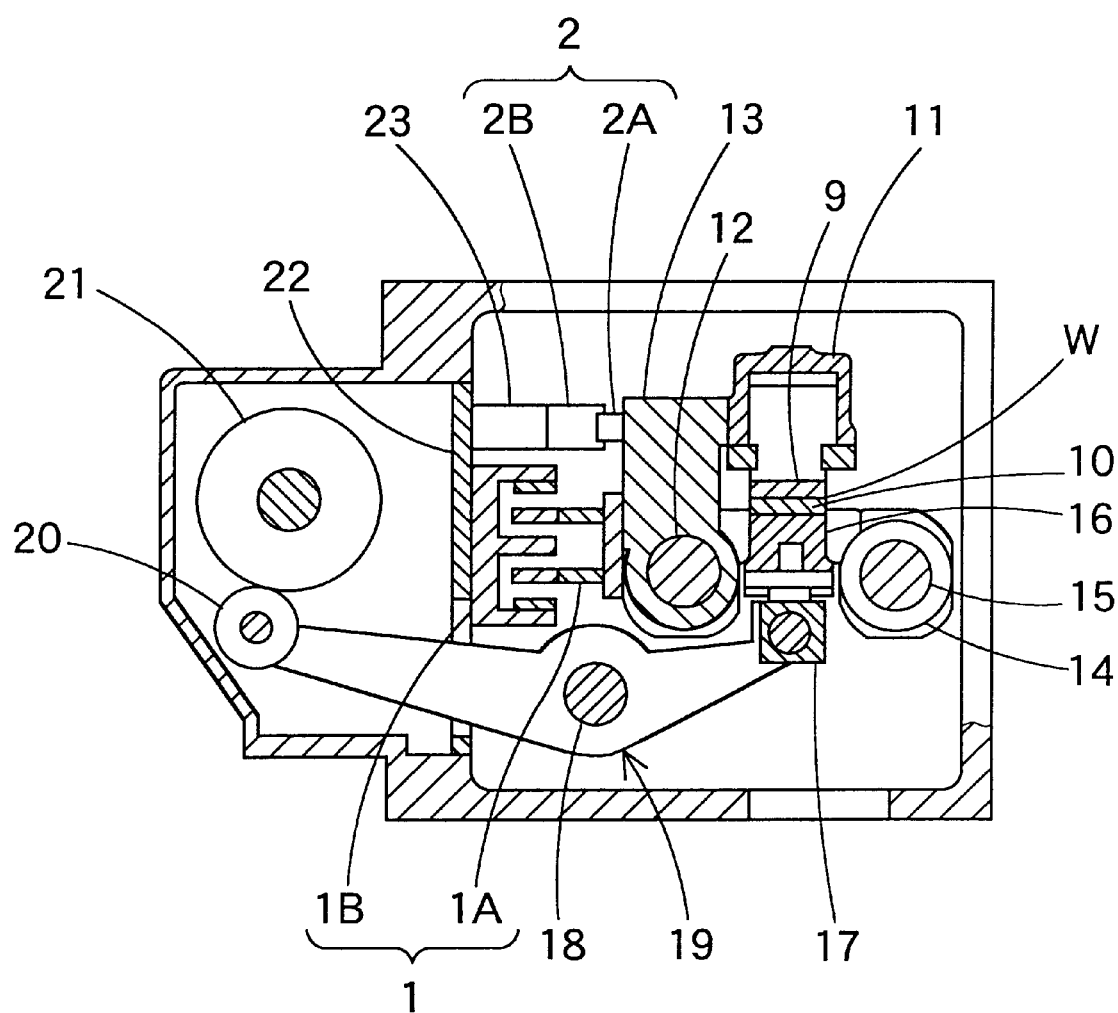
FIG. 4 is a longitudinal sectional view of a drive system of a feed gripper.

FIG. 4 is a longitudinal sectional view of a drive system of the feed gripper 6.

In FIG. 4, the upper movable jaw 9 of the feed gripper 6 is held movable up and down elastically by a cylinder part 11. The cylinder part 11 is fixed to a cylinder holder 13 installed slidable to a first guide shaft 12 extending in the feed direction (front and rear direction in the figure). A holding member 14 is extended from the cylinder holder 13, and is installed slidable to a second guide shaft 15 arranged in parallel to the first guide shaft 12. Thus the upper movable jaw 9 becomes integral with the cylinder holder 13 and can be moved in reciprocation to the feed direction.

On the other hand, the lower movable jaw 10 of the feed gripper 6 is fixed to an upper surface of an arm 16 coupled with a pin (not shown) fixed to the cylinder holder 13. The pin is positioned on the horizontal surface orthogonal to the feed direction, and the arm 16 is coupled rockable in the vertical direction (vertical direction in the figure) with respect to the pin as the rocking center and the top end portion of the arm 16 is normally pressed downward by the energizing force of a spring (not shown). The arm 16 is supported movable in reciprocation to the feed direction by a slider 17. The slider 17 is arranged on one end of a rocker arm 19 rockable about a shaft 18, and can be moved up and down. A cam follower 20 is arranged on other end of the rocker arm 19, and abuts on a cam 21 whose drive source is a crank shaft of the press P.

Thus the lower movable jaw 10 of the feed gripper 6 becomes integral with the cylinder holder 13 and can be moved in reciprocation to the feed direction, and also can be moved up and down.

A movable part 1A of a linear motor 1 is fixed to the cylinder holder 13. A stationary part 1B of the linear motor 1 is fixed to a machine frame 22. Also a movable part 2A of a linear scale 2 as a position detector is fixed to the cylinder holder 13. A stationary part 2B of the linear scale 2 is fixed to the machine frame 22 through a bracket 23.

In the linear motor 1, such known device that comes into the market generally may be used.

Figure 5:
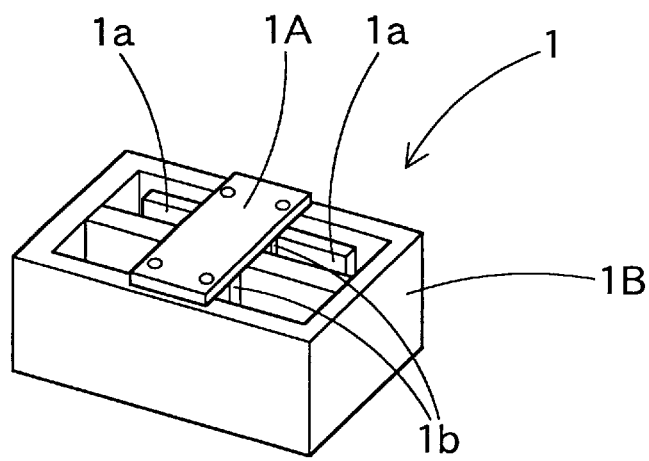
FIG. 5 is a perspective view of an example of a linear motor.
Figure 6:
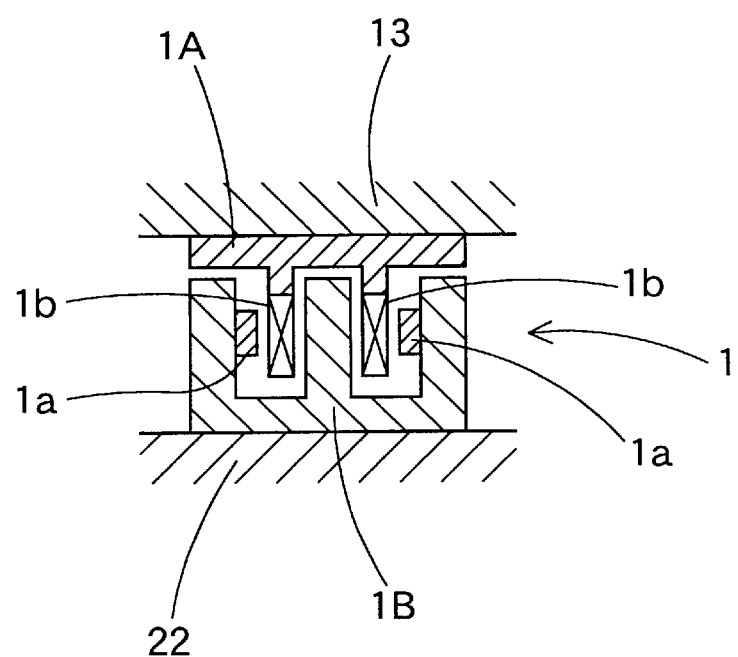
FIG. 6 is a sectional view of the linear motor.

A linear motor 1 shown in FIGS. 4, 5 and 6 is constituted by a stationary part 1B of E-like shaped cross section having a permanent magnet 1a fixed to the inner surface, and a movable part 1A of U-like shaped cross section having a coil member 1b provided in opposition to the permanent magnet 1a.

Figure 7:
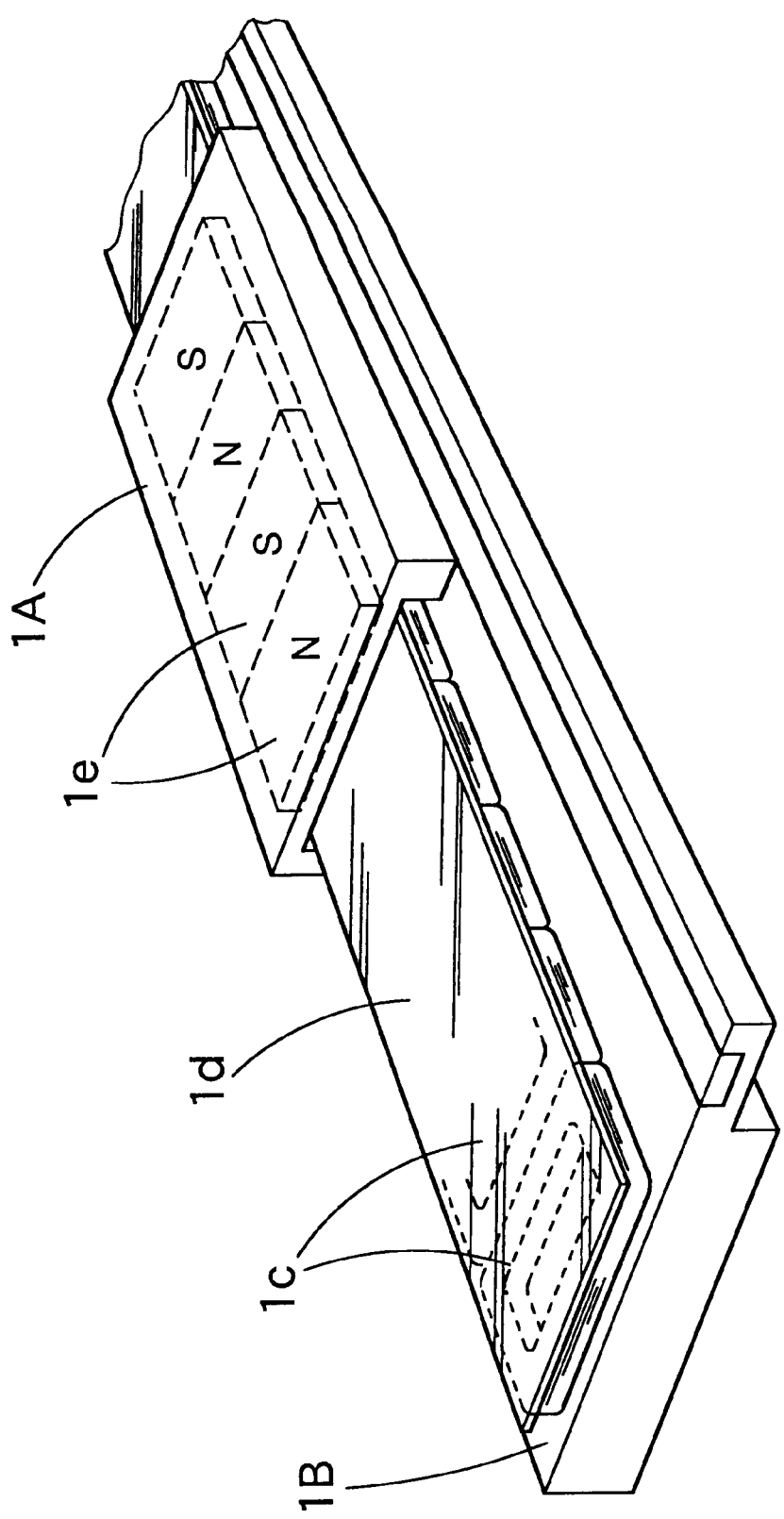
FIG. 7 is a perspective view of another example of a linear motor.

In addition, the linear motor 1 is not limited to that shown in FIGS. 4, 5 and 6, but for example, as shown in FIG. 7, such constitution may be used that a plurality of coils 1c are arranged in the longitudinal direction on one surface of the stationary part 1B, and a substrate 1d is arranged on these coils 1c, and the movable part 1A is formed in the cross section of U-like shape so as to surround the coils 1c and the substrate 1d, and on the inner surface, a permanent magnet 1e of field of multiple poles is mounted in opposition to the substrate 1d.

Figure 8:
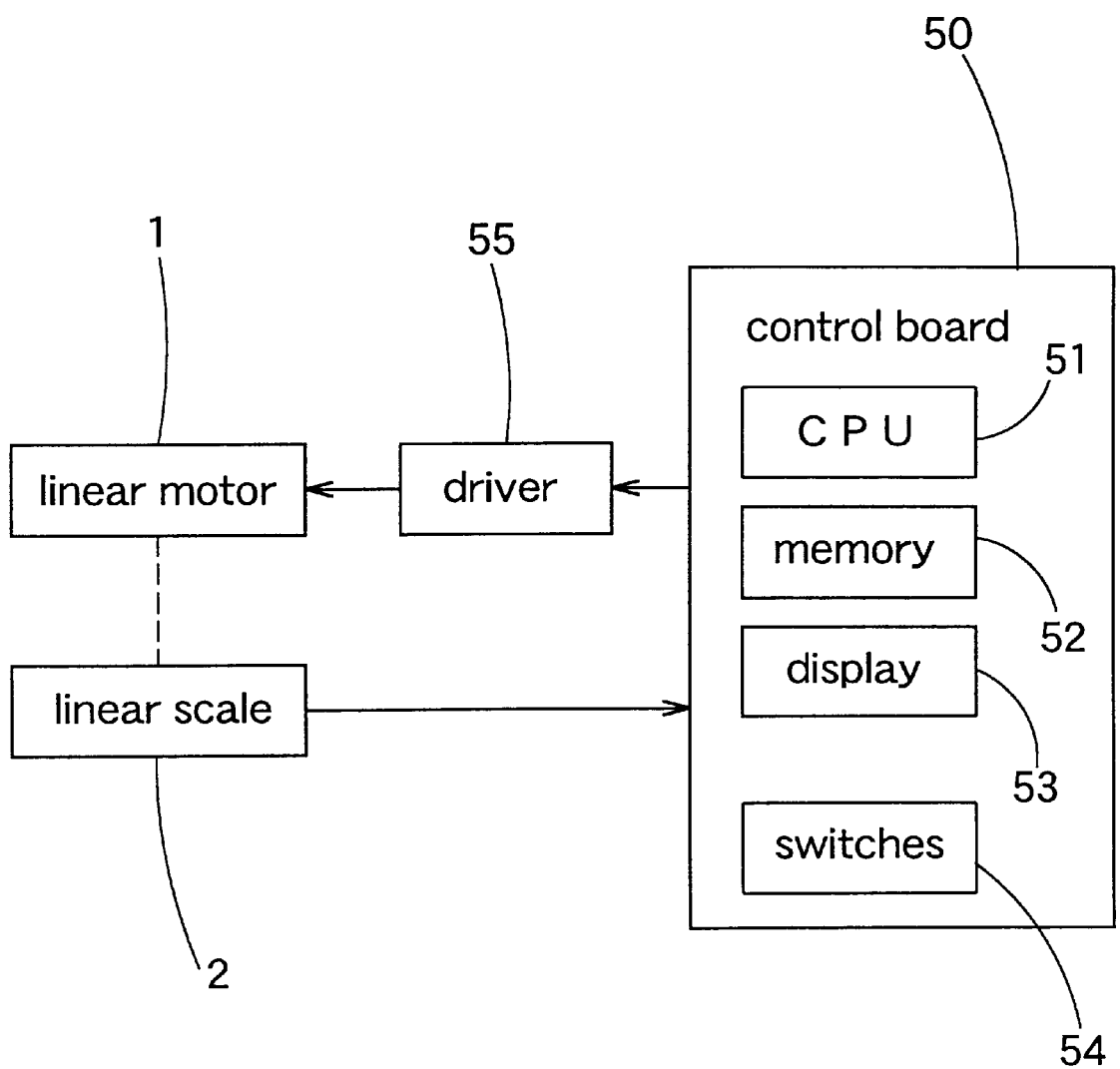
FIG. 8 shows connection state of a control board (control circuit) of a control device of a feed gripper and a linear motor or the like connected there.

FIG. 8 shows a control board (control circuit) 50 of the control device 4 of the feed gripper 6 and connection state to the linear motor 1 or the like connected there.

The control circuit 50 is constituted using a CPU 51 being the main part, and controls the operation of the feed gripper 6 based on program data stored previously in a fixed memory. The control circuit 50 is provided with a temporary memory 52 which can be read or written at any time, a display 53, and switches 54 for inputting or operating various sorts of set values. The memory 52 is provided with program data determining operation pattern of the feed gripper 6, for example, a memory area for storing the feed amount, the return amount of the feed gripper 6, the start position and the finishing position of the feed and the return, the moving speed (time) of the feed gripper 6 or the like.

The linear scale 2 is connected to an interface circuit within the control circuit 50, and sends reading of the linear scale 2, that is, the position detection data (real position data) of the feed gripper 6 to the control circuit 50. A driver 55 is connected to the linear motor 1, and further connected to the interface circuit within the control circuit 50. During the operation, in the linear motor 1, for example, that of an AC servo motor (three-phase synchronous motor) system having large thrust is used, and the driver 55 has a servo amplifier for example, and drives the linear motor 1 in response to the command value output from the control circuit 50.

Figure 9:
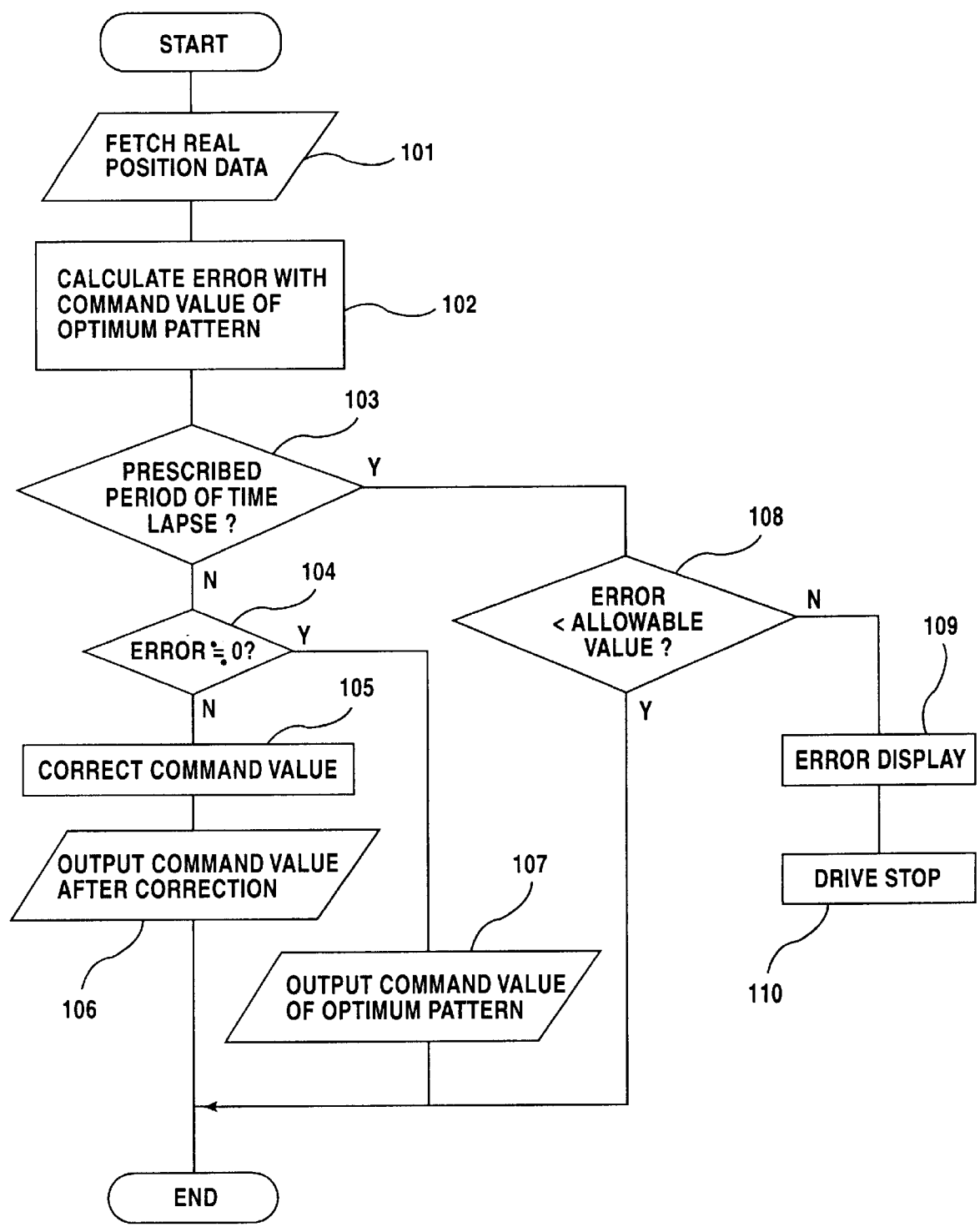
FIG. 9 is a flow chart showing processing content of a control circuit.

Next, processing according to the present invention executed in the control circuit 50 will be described based on a flow chart shown in FIG. 9.

When the linear motor 1 starts the driving, the control circuit 50 fetches the real position data in the front and rear direction of the feed gripper 6 from the linear scale 2 (step 101). Next, from the optimum pattern of the behavior of the feed gripper 6 previously fixed and stored, the command value to be subsequently outputted is read out, and error between the fixed command value of the optimum pattern and the real position data is calculated (step 102). Next, decision is effected regarding whether or not a prescribed period of time lapses from the drive start of the linear motor 1 (step 103). Here the prescribed period of time is set to the time until the actual behavior of the feed gripper 6 converges to the optimum pattern by the execution of the learning control. Immediately after the drive start of the linear motor 1, the decision result in the step 103 becomes "YES", and next decision is effected regarding whether it is without error or not (step 104). If the decision is effected that it is with error, in order to eliminate the error, the error component is added to the fixed command value of the optimum pattern and the command value to be output is corrected (step 105), and the command value after the correction is output to the driver 55 (step 106).

Such correction of the command value to be output is performed repeatedly. As a result, the behavior of the feed gripper 6 approaches the optimum pattern. If the behavior of the feed gripper 6 becomes coincident with the optimum pattern, since there is no error, the decision result in the step 104 is reversed to "YES", and the fixed command value of the optimum pattern is output as the output command value (step 107).

And then if the prescribed period of time lapses from the drive start of the linear motor 1, the decision result in the step 103 is reversed to "YES", and the decision is effected regarding whether or not the error is more than the allowable value (step 108). Here the allowable value is set based on error produced due to misfeed, for example, generation of the clamp failure of the continuous material, breakage of the mechanical drive system, breakage of the metal mold or the like. If the decision is effected that the error exceeds the allowable value, the real behavior pattern based on the real position data is compared with the behavior pattern in each misfeed previously fixed and stored in each misfeed. Sort of the misfeed corresponding to the coincident behavior pattern is displayed on a display 53 (step 109), and the linear motor 1 is stopped in driving (step 110).

Also the control circuit 50 stores the result of the learning control within the prescribed period of time, in other words, the command value after the correction or the error. The stored command value after the correction or the error can be utilized in the control of an another gripper feed operating the feed gripper 6 by the same optimum pattern as the optimum pattern in the behavior of the feed gripper 6. In this case, as described later, it is particularly effective in the control of a gripper feed having no linear scale 2.

As the continuous material feed device M, there is a roll feed or a roll gripper other than the gripper feed as above described.

Figure 10:
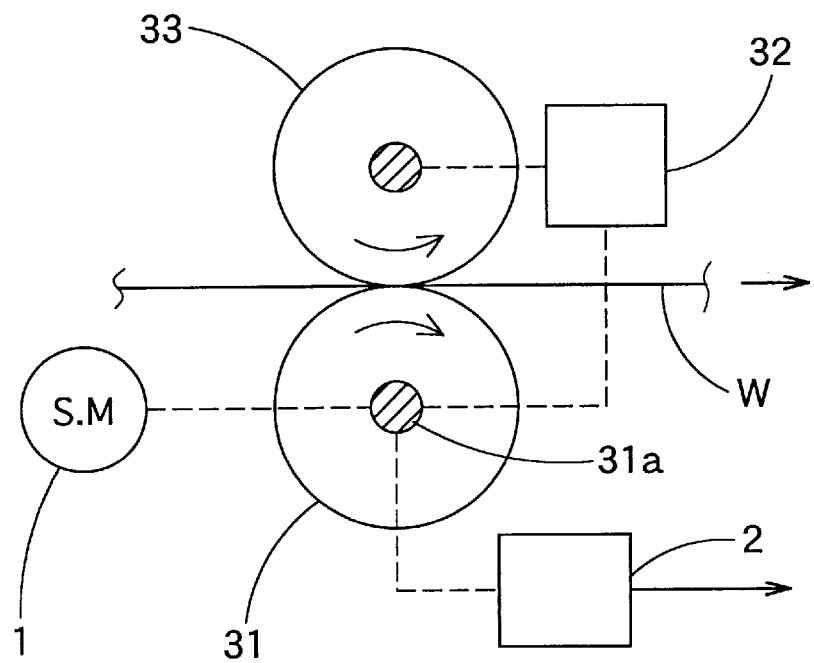
FIG. 10 is a diagram showing a constitution example of a roll feed.

FIG. 10 shows a constitution example of a roll feed. In FIG. 10, the roll feed is provided with a lower roll 31 driven by a servo motor 1, and an upper roll 33 driven through a gear mechanism 32 mounted on a rotational shaft 31a of the lower roll 31. The servo motor 1 is driven intermittently so that a continuous material W is sent to a press P intermittently. The roll feed is provided with a position detector 2 detecting the rotational position of the roll, and the position detector 2 is connected to a control circuit similar to the control circuit 50 shown in FIG. 8.

Also in the control device of the roll feed, the learning control with similar content to that of the control device of the gripper feed as above described is performed, and the servo motor 1 is controlled so that the behavior of the upper and lower rolls 31, 33 is coincident with the optimum pattern. In this case, as the behavior of the upper and lower rolls 31, 33, the rotational amount of the roll, the rotation start position, the rotation finishing position, the rotational speed or the like may be mentioned.

Figure 11:
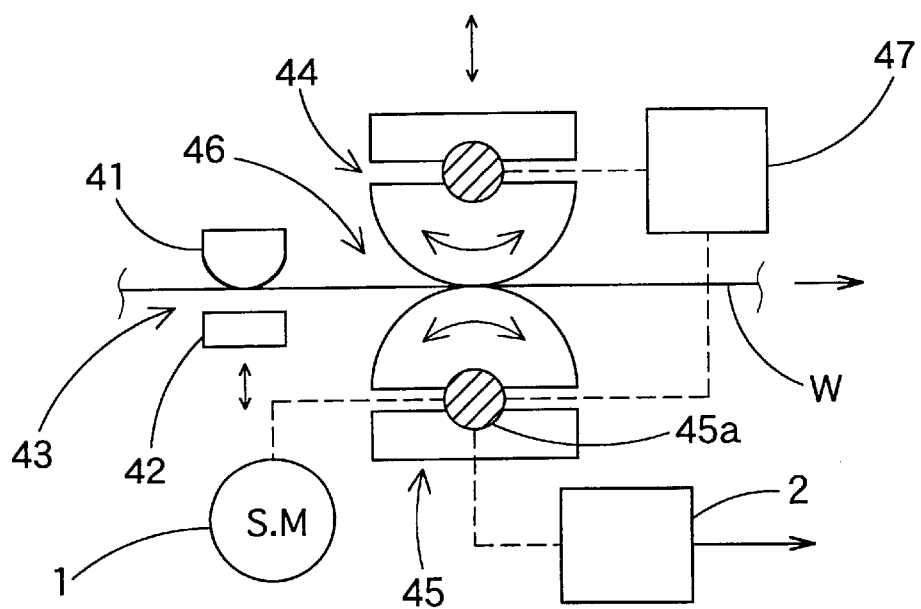
FIG. 11 is a diagram showing a constitution example of a roll gripper.
Figure 12:
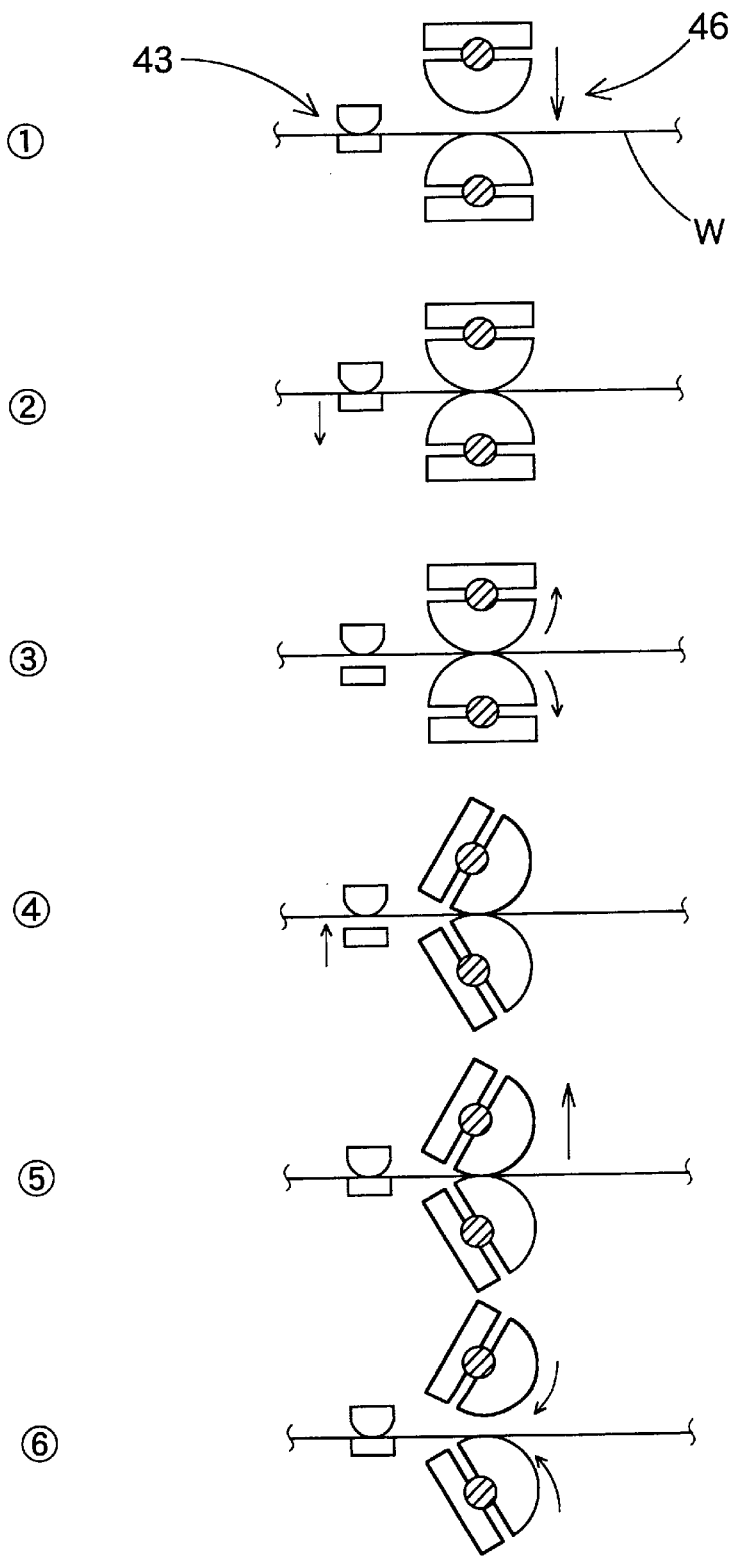
FIG. 12 is an operation explanation diagram of a roll gripper.

FIG. 11 shows a constitution example of a roll gripper. In FIG. 11, the roll gripper is constituted by a stationary gripper 43 comprising a stationary jaw 41 and a movable jaw 42 movable up and down, and a feed roll 46 comprising an upper roll 44 rockable and movable up and down and a lower roll 45 rockable. The lower roll 45 is rocked and driven by a servo motor 1, and the upper roll 44 is rocked and driven through a gear mechanism 47 fixed to a rotational shaft 45a of the lower roll 45. The roll gripper performs a series of operations shown in ①–⑥ of FIG. 12. That is, the feed operation of the feed roll 46 in the release state of the stationary gripper 43 and in the clamp state of the feed roll 46 and the return operation of the feed roll 46 in the clamp state of the stationary gripper 43 and in the release state of the feed roll 46 are performed repeatedly, and a continuous material W is sent intermittently to a press P. The roll gripper is provided with a position detector 2 detecting the rotational position of the roll, and the position detector 2 is connected to a control circuit similar to the control circuit 50 shown in FIG. 8.

Also in the control device of the roll gripper, the learning control with similar content to that of the control device of the gripper feed as above described is performed, and the servo motor 1 is controlled so that the behavior of the upper and lower rolls 44, 45 is coincident with the optimum pattern. In this case, as the behavior of the upper and lower rolls 44, 45, the feed rotational amount and the return rotational amount of the roll, the rotation start position, the rotation finishing position, the rotational speed or the like may be mentioned.

Figure 13:
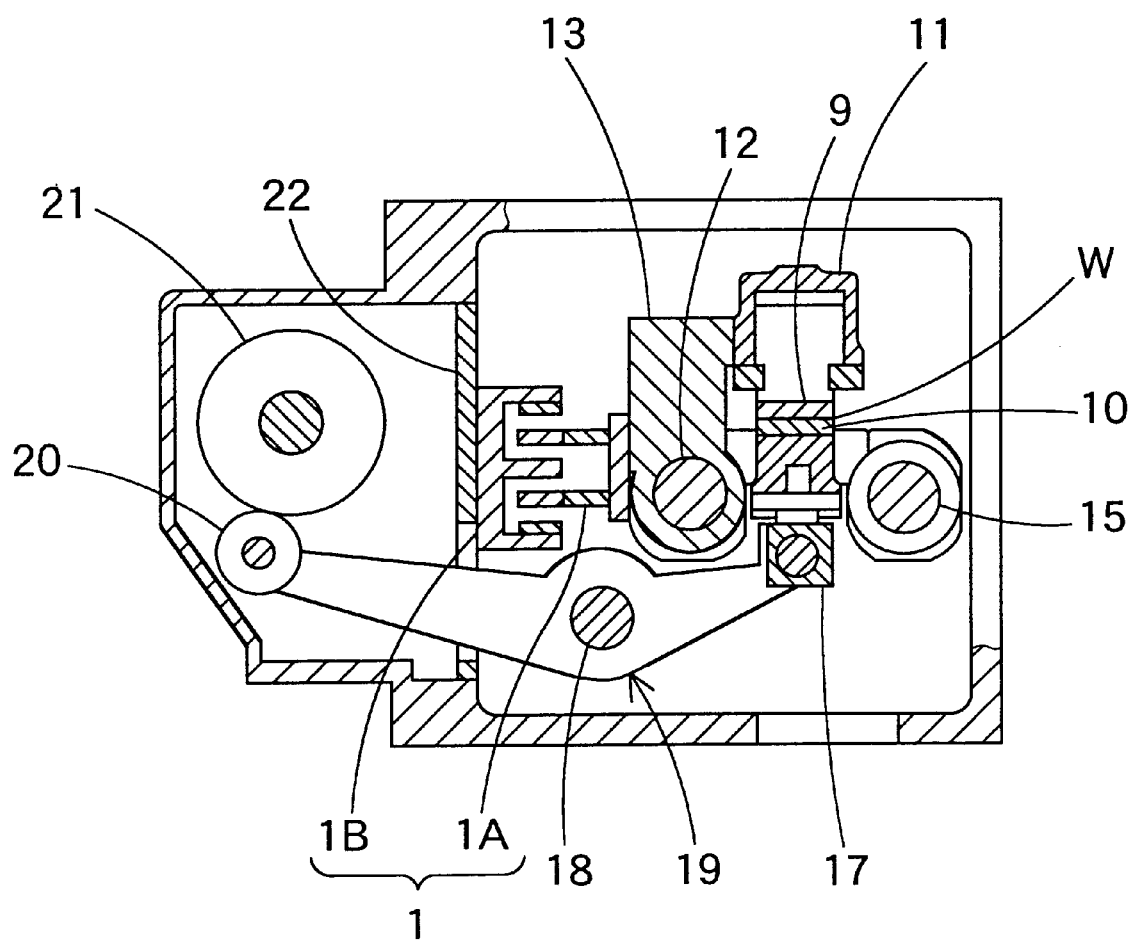
FIG. 13 is a schematic sectional view of a drive system of a feed gripper in a gripper feed as a continuous material feed device in which a control device according to another embodiment of the invention is to be assembled.

FIG. 13 is a schematic sectional view showing a drive system of a feed gripper 6 in a gripper feed as a continuous material feed device M to which a control device according to another embodiment of the present invention is assembled. FIG. 13 corresponds to FIG. 4 as above described.

In FIG. 13, the gripper feed is the gripper feed itself in FIG. 4 excluding the position detector 2 and the bracket 23, or a gripper feed in the same sort as that of the gripper feed in FIG. 4 having neither the position detector 2 nor the bracket 23.

The control device of the gripper feed utilizes the learning result obtained by the control device of the gripper feed as above described, that is, the command value after the correction or the error within the prescribed period of time, thereby even if the position detector 2 is not provided, the control is performed so that the behavior of the feed gripper 6 can be made coincident with the optimum pattern.

Figure 14:
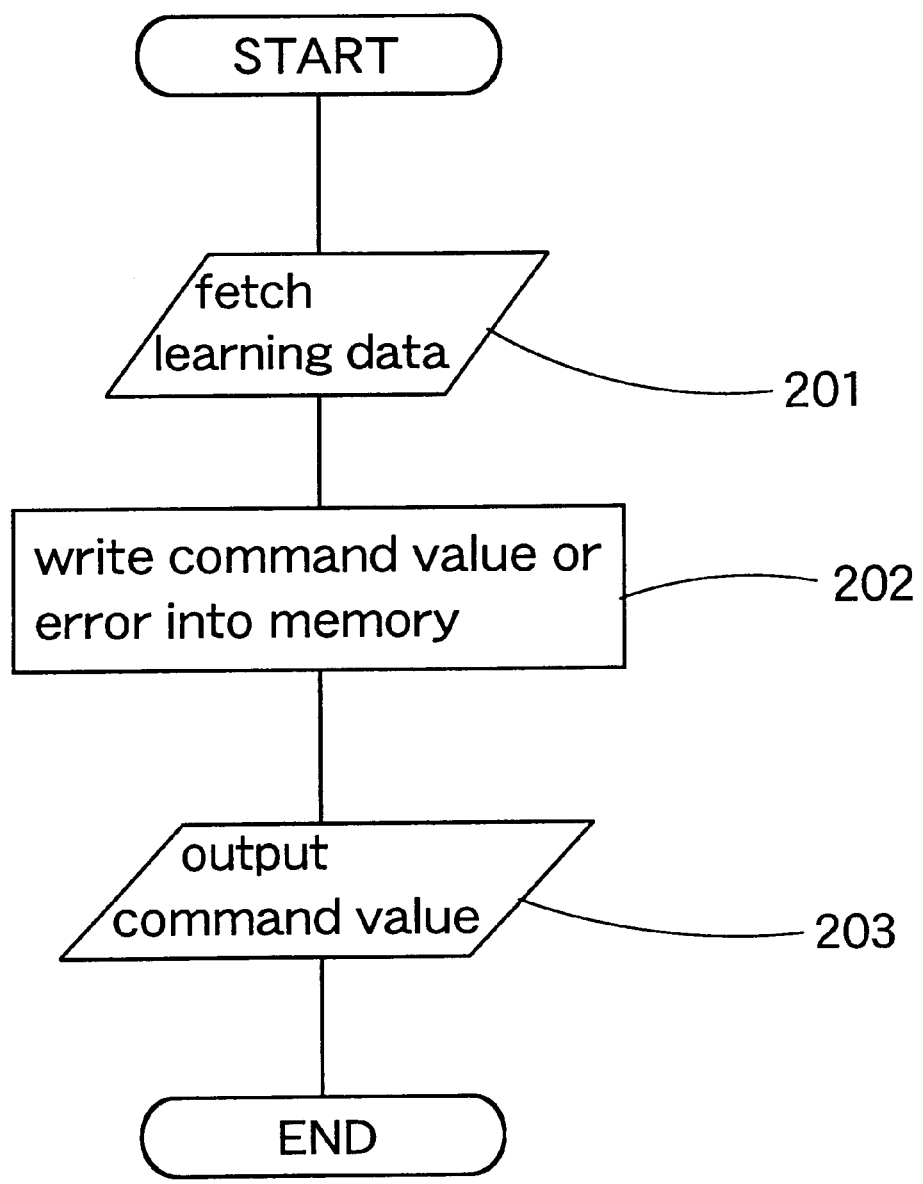
FIG. 14 is a flow chart showing processing content of the control device.

That is, as shown in FIG. 14, the control device fetches the learning data being the result of the learning control using the above-mentioned gripper feed from the memory of the control device of the gripper feed to the control device (step 201), and the command value or the error of the learning data is written into the memory of the control device (step 202). And then when the gripper feed is operated, the command value or the error is read out from the memory, and the command value calculated from the read-out command value or the read-out error is output (step 203).

A control device of a continuous material feed device according to the present invention comprises a position detector for detecting position of a continuous material feed mechanism, and a control circuit for fixing and storing previously the optimum command value of behavior of the continuous feed mechanism, for calculating error between the real position data from the position detector and the fixed command value of the optimum pattern in a prescribed period of time from the drive start of the continuous material feed mechanism, and for correcting the command value to be outputted in order to eliminate the error and outputting the command value after the correction and controlling a motor driving the continuous material feed mechanism. When a linear motor or a servo motor is used as the motor, the feed accuracy of the continuous feed mechanism can be improved.

When the control circuit is provided with function of stopping a motor after lapse of the prescribed period of time, if the error between the real position data and the feed command value of the optimum pattern exceeds the allowable value based on the misfeed, the malfunction attendant on the misfeed generation can be prevented.

Also when the control circuit is provided with function of storing the command value after the correction or the error within the prescribed period of time, the stored command value after the correction or the error can be utilized in the control of another continuous material feed device operating a continuous material feed mechanism by the same optimum pattern as the optimum pattern of the behavior of the continuous material feed mechanism. In this case, the control circuit is particularly effective in the control of a continuous material feed device not having a linear scale.

What is claimed is:

1. A control device of a continuous material feed device having a motor for driving a continuous material feed mechanism, and transferring a continuous material into a press intermittently, said control device comprising:

a position detector for detecting position of said continuous material feed mechanism; and a control circuit for fixing and storing previously an optimum pattern command value of behavior of said continuous material feed mechanism, for calculating an error between a real position data from said position detector and a fixed command value of an optimum pattern in a prescribed period of time from a drive start of the continuous material feed mechanism, for correcting a command value to be output in order to eliminate the error, for outputting the command value after correction and for controlling said motor.

2. A control device of a continuous material feed device as set forth in claim 1, wherein after lapse of the prescribed period of time, if error between the real position data and the fixed command value of the optimum pattern exceeds an allowable value based on the misfeed, said control circuit stops said motor.

3. A control device of a continuous material feed device as set forth in claim 1 or claim 2, wherein said control circuit stores the command value after the correction or the error within the prescribed period of time.

4. A control device of a continuous material feed device as set forth in claim 1 or claim 2, wherein said motor is a linear motor.

5. A control device of a continuous material feed device as set forth in claim 1 or claim 2, wherein said motor is a servo motor.

6. A control device of a continuous material feed device having a linear motor for driving a continuous material feed mechanism, and transferring a continuous material into a press intermittently, said control device comprising:

a position detector for detecting position of said continuous material feed mechanism; and a control circuit for fixing and storing previously an optimum pattern command value of behavior of said continuous material feed mechanism, for calculating an error between a real position data from said position detector and a fixed command value of an optimum pattern in a prescribed period of time from a drive start of the continuous material feed mechanism, for correcting a command value to be output in order to eliminate the error, for outputting the command value after correction and for controlling said motor, wherein after lapse of the prescribed period of time, if the error between the real position data and the fixed command value of the optimum pattern exceeds an allowable value based on misfeed, said control circuit stops said linear motor and stores the command value after the correction or the error within the prescribed period of time.

7. A control device of a continuous material feed device having a servo motor for driving a continuous material feed mechanism, and transferring a continuous material into a press intermittently, said control device comprising:

a position detector for detecting position of said continuous material feed mechanism; and a control circuit for fixing and storing previously an optimum pattern command value of behavior of said continuous material feed mechanism, for calculating a difference between a real position data from said position detector and a fixed command value of an optimum pattern in a prescribed period of time from a drive start of the continuous material feed mechanism, for correcting a command value to be output in order to eliminate the error, for outputting the command value after correction and for controlling said servo motor, wherein after lapse of the prescribed period of time, if the error between the real position data and the fixed command value of the optimum pattern exceeds an allowance value based on misfeed, said control circuit stops said servo motor and stores the command value after the correction or the error within the prescribed period of time.

8. A control device of a continuous material feed device comprising:

a motor for driving a continuous material feed mechanism, and a control circuit for controlling said motor, wherein in a control device of the continuous material feed device constituted by mounting a position detector for detecting position of the continuous material feed mechanism to the continuous material feed device itself or the continuous material feed device of a same sort as that of the continuous material feed device, said control circuit fixed and stores previously an optimum pattern command value of behavior of said continuous material feed mechanism, and calculates an error between a real position data from said position detector and a fixed command value of an optimum pattern in a prescribed period of time from a drive start of the continuous material feed mechanism, and corrects the command value to be output in order to eliminate the error and outputs the command value after correction and controls said motor, wherein said motor is controlled based on the command value after the correction or the error within the prescribed period of time, obtained by the control device having the control circuit.

9. A control device of a continuous material feed device as set forth in claim 8, wherein said motor is a linear motor.

10. A control device of a continuous material feed device as set forth in claim 8, wherein said motor is a servo motor.

* * * * *